United States Patent Office 2,962,106
Patented Nov. 29, 1960

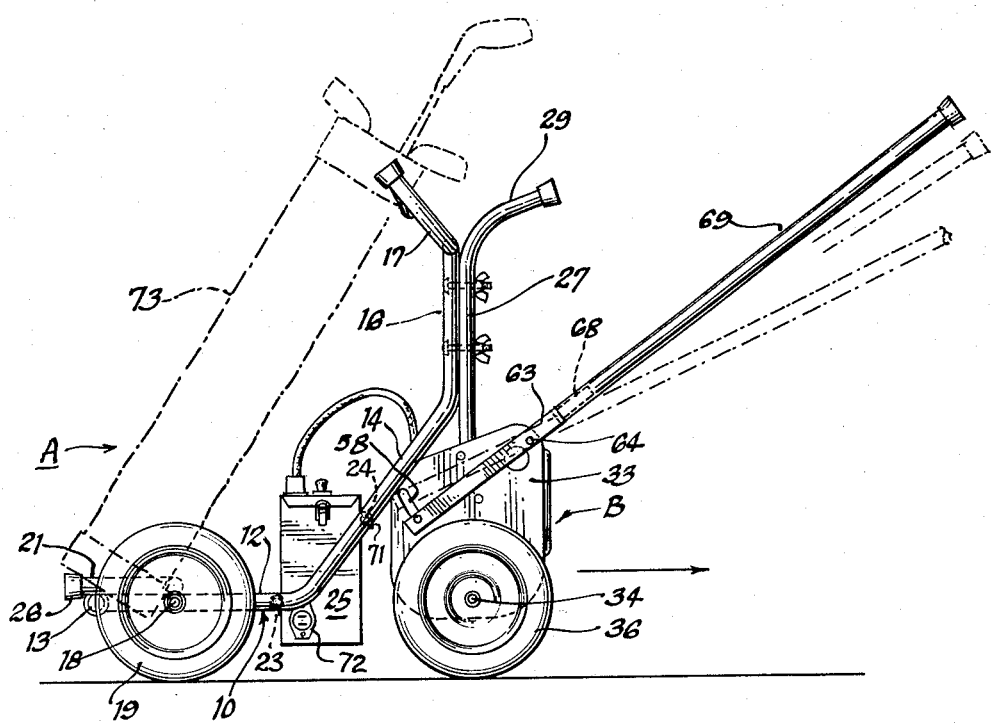
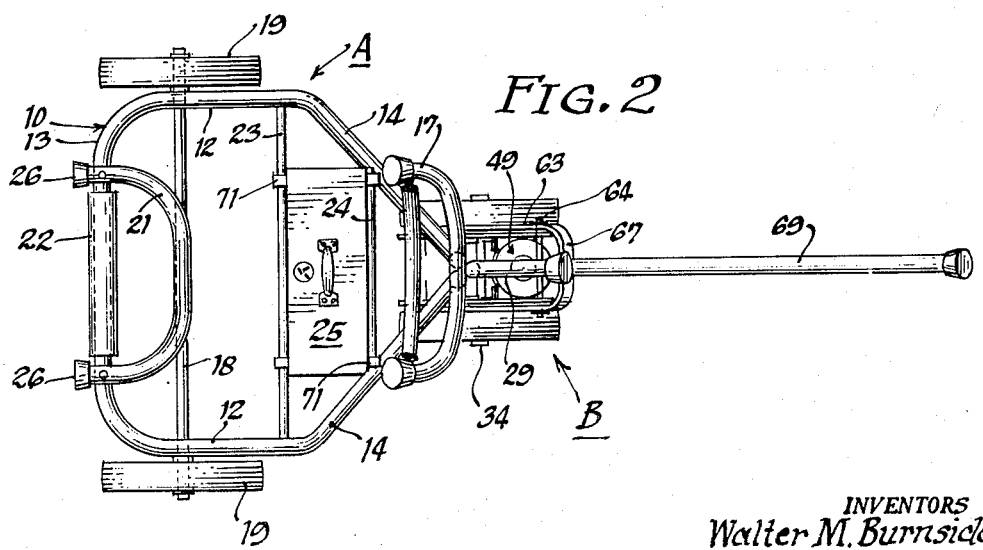

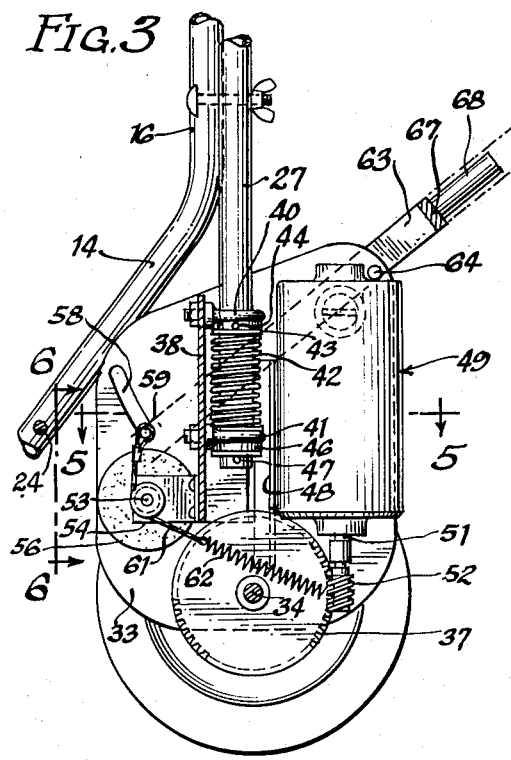
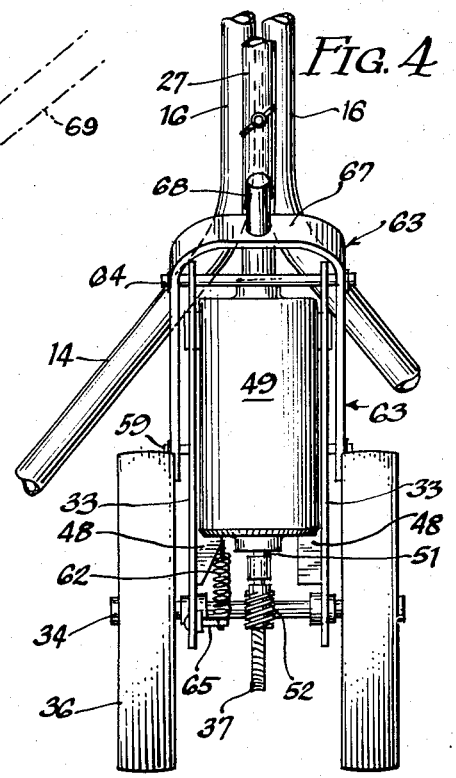
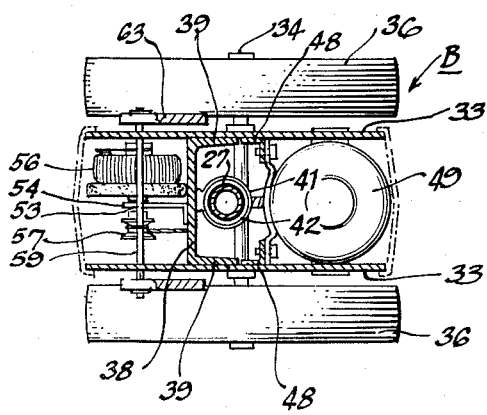
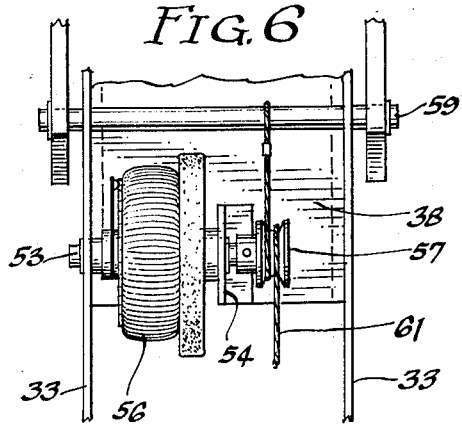

2,962,106
MOTORIZED VEHICLE

Walter M. Burnside and Gaylord M. Borst, Waukegan, Ill., assignors to Orival E. Borst, Waukegan, Ill.

Filed Oct. 26, 1959, Ser. No. 848,801

6 Claims. (Cl. 180—19)

This invention relates to a motorized vehicle particularly adapted to transport golf equipment and other light loads at variable speeds.

One of the objects of our invention is the provision of a novel battery-energized, motor-driven vehicle particularly adapted for use in transporting golf equipment and other light loads at variable speeds.

Another object of our invention is the provision of a vehicle of the foregoing character including a control handle arranged to operate a rheostat to automatically vary the amount of current supplied from the battery to the motor in accordance with the degree downward pressure applied to the control handle thereby to adjust the speed to match the walking pace of the operator.

A further object of our invention is the provision of a vehicle of the foregoing character wherein guiding and control of the vehicle by the operator is facilitated, there being required only a light touch on the handle to steer the vehicle and control the speed of its travel.

Other and further objects and advantages of our invention will become apparent from the following description when considered in connection with the accompanying drawings in which:

Figure 1 is a side elevational view of an embodiment of our invention particularly adapted for transporting golf equipment and the like;

Fig. 2 is a top plan view thereof;

Fig. 3 is a side elevational view on an enlarged scale showing the operating mechanism of the vehicle;

Fig. 4 is a front elevational view of the same;

Fig. 5 is a cross-sectional view taken substantially on line 5—5 of Fig. 3, and

Fig. 6 is a cross-sectional view taken substantially on line 6—6 of Fig. 3.

Referring to the drawings the vehicle of our invention comprises a rear load-carrying section A and forward steering and traction section B hingedly connected together. The rear section A comprises a closed integral tubular frame, indicated generally by the numeral 10, and including a horizontally disposed portion formed of parallel members 12 connected by a transverse member 13, an upwardly inclined portion formed of converging members 14, a vertical portion formed of parallel members 16 and a cradle portion formed of members 17. An axle 18 is supported in members 12 and mounted on each end is a ground-engaging supporting wheel 19. A substantially U-shaped member 21 overlies the transverse member 13 and axle 18 and is suitably secured thereto. A sleeve 22 of resilient material encases the medial portion of member 13 between the legs of the U-shaped member 21. Transverse members 23 and 24 secured respectively to members 12 and 14 afford means for supporting a battery case 25 hereinafter to be described. The ends of the U-shaped members 21 are provided with resilient bumper caps 26. A vertical tubular column 27 is suitably bolted to the parallel members 16 as shown. The upper end of the column terminates in a forwardly extending handle portion 29.

The forward steering and traction section B comprises a pair of substantially parallel plates 33 in which is journaled an axle 34, on each end of which is mounted a ground-engaging traction wheel 36. Keyed to the axle 34, medially thereof is a worm gear 37.

Extending vertically between the plates 33 is a channel member 38, the flanges 39 of which are suitably bolted to the plates 33. A pair of eye members 40 and 41 are mounted on the channel member 38 with the eyes in spaced axial alignment. The lower end of column 27 is rotatably and slidably received in said eye members affording a hinged connection between sections A and B. A compression spring 42 concentric with column 27 is interposed between the lower eye member 41 and a washer 43 abutting a pin 44 extending transversely through column 27. The lower end of column 27 carries a washer 46 confined by a pin 47 extending transversely through column 27. The spring 42 serves to cushion the load-carrying section of the vehicle in relation to up-and-down movement of the same.

Two angle brackets 48, 48 are bolted each to a respective plate 33 and are arranged to support a series-wound electric motor 49 disposed between plates 33 with the axis of the drive shaft 51 disposed substantially vertically and having fastened to the lowermost end of the shaft a pinion 52 operatively engaged with worm gear 37.

A shaft 53 is journaled in one of the plates 33 and in an angle bracket 54 which is bolted to the channel member 38. Operatively connected with said shaft is the rotor member of a variable rheostat 56 and fixed on one end of the shaft is a pulley 57. Rotation of the shaft 53 will effect corresponding rotation of the rotor member of the rheostat.

The plates 33 are provided with registering slots 58 in which is slidably received a transverse bar 59, the ends of which project beyond the plates 33 as illustrated in Fig. 6. A flexible cable 61 is secured at one end to bar 59 and is wrapped at least one full turn around the pulley 57, the opposite end of the cable being attached to a tension spring 62 anchored to a bolt 65 secured to one of the plates 33. The spring 62 serves to bias the rheostat to normal off position.

A yoke member 63 is pivotally supported on pivot bolts 64 mounted in plates 33. The free ends of the arms of the yoke member 63 are provided with apertures arranged to receive the transverse bar 59 and the bight portion 67 of the yoke member is provided with a cylindrical projection 68 arranged to be received in the lower end of a tubular control handle 69.

It will be apparent that rocking of the handle 69 about the axis of pivot bolts 64 will effect movement of the bar 59 within the limits of the slots 58 and through the medium of the cable 61 will effect rotation of the rotor member of the rheostat 56. The handle 69 is removable for convenience in storing the vehicle and also for the purpose of preventing unauthorized use of the vehicle.

A battery case 25 containing a storage battery is provided externally thereof with suitable brackets 71 which are adapted to engage the bars 23 and 24 for supporting the battery case. The battery poles are connected in a conventional electrical circuit to the motor 49 and rheostat 56. The battery case 25 may house a suitable battery charger connected to the poles of the battery and the charger may be connected to a suitable socket 72 affording a ready electrical connection to a source of electrical power.

In use the load 73, which may consist of a golf bag or other equipment, is supported on rear section A in the manner illustrated in Fig. 1 with the load, in the case of a golf bag, resting on the members 13 and 21 and the upper portion of the bag resting in the cradle portion 17. In normal out-of-use position the handle 69 is biased to its uppermost position, substantially as illustrated by the solid lines in Fig. 1 and is retained in such position by the spring 62. In order to operate the vehicle, the operator merely stands along one side of the handle 69, somewhat forwardly of section A, and by applying a light downward pressure on the handle effects rocking of the rheostat rotor member to supply current to the motor 49. The handle 69 is depressed to a point where the speed of the vehicle is caused to correspond to the desired pace of the operator and is more or less maintained in such position by the operator as he walks along. The vehicle, of course, is easily steered by the handle. It will be understood that the value of the current supplied to the motor 49 is in accordance with the movement of the handle 69, the greater the movement of the handle the greater the current and the faster the travel of the vehicle.

The vehicle of our invention is particularly easy to maneuver and control. It will readily respond to any variation in the walking pace of the operator or change in diretcion and will stop almost instantaneously upon release of the handle by the operator.

Our invention has the additional advantage that it may be employed to afford assistance to the operator in walking on a level surface or up an incline or slope, the vehicle in effect drawing the operator along while he grasps the handle.

Various changes coming within the spirit of our invention may suggest themselves to those skilled in the art; hence, we do not wish to be limited to the specfic embodiments shown and described or uses mentioned, but intend the same to be merely exemplary, the scope of our invention being limited only by the appended claims.

We claim:

1. In a follower vehicle of the character described, a wheeled structure including a rear load-carrying section and a forward-steering and traction section, said sections being connected together for relative pivotal movement about a vertical axis, said forward section being supported on a pair of spaced traction wheels, an electric motor carried on said forward section and operatively connected with said traction wheels, an electric circuit including a battery, said motor and current control means adapted to be adjusted in fine increments, a forwardly extending towing handle mounted on said forward section for pivotal movement about a horizontal axis, means operatively connecting said handle with said control means, spring means normally biasing said control means to off position, said control means being responsive to a relatively slight pivotal movement of the handle to vary the current supplied to the motor in accordance with variations in the movement of the handle to permit the incremental variations in the pace of the operator to correspondingly control critically the speed of the vehicle in consequence of the resulting tilting movement imposed upon the handle.

2. In a follower vehicle of the character described, a wheeled structure including a rear load-carrying section and a forward-steering and traction section, said sections being connected together for relative pivotal movement about a vertical axis, said forward section including a pair of spaced substantially parallel plate members, an axle journaled in the lower portions of said plate members, a pair of ground-engaging traction wheels mounted on said axle, a motor supported between said plate members with the drive shaft thereof disposed substantially vertically, cooperating gear means carried on said shaft and said axle for effecting a driving connection between the motor and the axle, a rheostat disposed between said plates and having a rotor member, a pulley operatively connected with said rotor member, a cable operatively engaged with said pulley whereby movement of said cable will effect rotation of said pulley, spring means connected to said cable and normally biasing said rotor member to off position, a forwardly extending handle mounted on said plate members for pivotal movement about a horizontal axis, said handle having an extension beyond its pivotal axis, said cable being connected to said extension and being responsive to the movement of said handle whereby a slight downward movement of the handle will rock said rotor member to vary the current supplied to the motor in accordance with variations in the movement of the handle.

3. In a follower vehicle of the character described, a wheeled structure including a rear load-carrying section and a forward-steering and traction section, said sections being connected together for relative pivotal movement about a vertical axis, said forward section including a pair of spaced substantially parallel members, an axle journaled in the lower portions of said members, a pair of ground-engaging traction wheels mounted on said axle, a motor supported between said members with the drive shaft thereof disposed substantially vertically, cooperating gear means carried on said shaft and said axle for effecting a driving connection between the motor and the axle, a rheostat disposed between said parallel members and having a rotor member, a pulley operatively connected with said rotor member, a flexible member operatively engaged with said pulley whereby movement of said flexible member will effect rotation of said pulley, spring means connected to said flexible member and normally biasing said rotor member to off position, a forwardly extending handle mounted on said parallel members for pivotal movement about a horizontal axis, said handle having an extension beyond its pivotal axis, said flexible member being connected to said extension and being responsive to the movement of said handle whereby a relatively slight pivotal movement of the handle will rock said rotor member to vary the current supplied to the motor in accordance with variations in the movement of the handle.

4. In a follower vehicle of the character described, a wheeled structure including a rear load-carrying section and a forward steering and traction section, said sections being connected together for relative pivotal movement about a vertical axis, said forward section including a pair of spaced substantially parallel members, an axle journalled in the lower portions of said members, a pair of ground engaging traction wheels mounted on said axle, a motor supported between said members with the drive shaft thereof displaced substantially vertically, cooperating gear means carried on said shaft and said axle for effecting a driving connection between the motor and the axle, a rheostat carried on said forward section and having a rotor member for adjusting said rheostat in fine increments, spring means normally biasing said rotor member to off position, a forwardly extending towing handling mounted on said parallel members for pivotal movement about a horizontal axis, said handle having an extension projecting rearwardly beyond its pivotal axis, means connecting said extension with said rotor member whereby a relatively slight pivotal movement of the handle will rock said rotor member to vary the current supplied to the motor in accordance with variations in the movement of the handle to permit the incremental variations in the pace of the operator to correspondingly control critically the speed of the vehicle in consequence of the resulting tilting movement imposed upon the handle.

5. In a follower vehicle of the character described, a wheeled structure including a rear load-carrying section and a forward steering and traction section, said sections being connected together for relative pivotal movement about a vertical axis, said forward section being supported on traction wheel means, an electric motor carried on said forward section and operatively connected with said traction wheel means, an electric circuit including a battery, said motor and a rheostat adapted to be adjusted in fine increments, a forwardly extending towing handle mounted on said forward section for pivotal movement about a horizontal axis, means operatively connecting said handle with said rheostat, spring means normally biasing said rheostat to off position, said rheostat being responsive to a relatively slight pivotal movement of the handle to vary the current supplied to the motor in accordance with variations in the movement of the handle to permit the incremental variations in the pace of the operator to correspondingly control critically the speed of the vehicle in consequence of the resulting tilting movement imposed upon the handle.

6. In a follower vehicle of the character described, a wheeled structure including a rear load-carrying section and a forward steering and traction section, said sections being connected together for relative pivotal movement about a vertical axis, said forward section being supported on a pair of spaced traction wheels, an electric motor carried on said forward section and operatively connected with said traction wheels, an electric circuit including a battery, said motor and a rheostat having a rotor member for adjusting said rheostat in fine increments, spring means normally biasing said rotor member to off position, a forwardly extending towing handle mounted on said forward section for pivotal movement about a horizontal axis, said handle having an extension projecting rearwardly beyond its pivotal axis, means operatively connecting said extension with said rotor member whereby a relatively slight pivotal movement of the handle will rock said rotor member to vary the current supplied to the motor in accordance with variations in the movement of the said handle to permit the incremental variations in the pace of the operator to correspondingly control critically the speed of the vehicle in consequence of the resulting tilting movement imposed upon the handle.

References Cited in the file of this patent

UNITED STATES PATENTS

| | | |
|---|---|---|
| 1,267,742 | Bulley | May 28, 1918 |
| 2,138,239 | Irgens | Nov. 29, 1938 |
| 2,327,583 | Framhein | Aug. 24, 1943 |
| 2,482,203 | Peterson et al. | Sept. 20, 1949 |
| 2,812,824 | Adams | Nov. 12, 1957 |
| 2,879,858 | Thomas | Mar. 31, 1959 |